United States Patent
Ohm et al.

(10) Patent No.: US 7,927,011 B2
(45) Date of Patent: Apr. 19, 2011

(54) METHOD OF ESTIMATING SURFACE TEMPERATURE OF A DIAGNOSTIC ULTRASOUND PROBE

(75) Inventors: Won Suk Ohm, Seoul (KR); Jeong Hwan Kim, Seoul (KR); Eun Chul Kim, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 532 days.

(21) Appl. No.: 11/970,752

(22) Filed: Jan. 8, 2008

(65) Prior Publication Data

US 2008/0165825 A1    Jul. 10, 2008

(30) Foreign Application Priority Data

Jan. 8, 2007   (KR) .................. 10-2007-0001924

(51) Int. Cl.
*G01K 11/22* (2006.01)
*A61B 8/00* (2006.01)

(52) U.S. Cl. .................. 374/117; 374/E1.019; 600/437; 600/438

(58) Field of Classification Search .................. 374/117, 374/E1.019, E13.001, E7.042; 702/130–136, 702/99; 600/437–444
See application file for complete search history.

(56) References Cited

U.S. PATENT DOCUMENTS

| | | | |
|---|---|---|---|
| 5,158,087 A * | 10/1992 | Gatzke ........................... | 600/438 |
| 6,669,638 B1 | 12/2003 | Miller et al. | |
| 6,824,518 B2 * | 11/2004 | Von Behren et al. ......... | 600/443 |
| 7,211,044 B2 * | 5/2007 | Mast et al ..................... | 600/439 |
| 2004/0102703 A1 * | 5/2004 | Behren et al. ................. | 600/443 |
| 2004/0127791 A1 * | 7/2004 | Mast et al. .................... | 600/438 |
| 2009/0028211 A1 * | 1/2009 | Amemiya ...................... | 374/117 |
| 2009/0054783 A1 * | 2/2009 | Shibata ......................... | 600/459 |
| 2009/0213897 A1 * | 8/2009 | Amemiya ...................... | 374/117 |

FOREIGN PATENT DOCUMENTS

EP    1 671 588 A1    6/2006

OTHER PUBLICATIONS

Sanders et al. "Ultrasound transducer self heating: Development of 3-D finite-element models" Journal of Physics: Conference Series 1 (2004). Advanced Metrology for Ultrasound in Medicine 2004 (ANUM 2004) Apr. 27-28, 2004. pp. 72-77. <Accessed> Dec. 1, 2010. <http://iopscience.iop.org/1742-6596/1/1/017/pdf/jpconf4_1_017.pdf>.*

Ohm et al. "Prediction of Surface Temperature Rise of Ultrasonic Diagnostic Array Transducers" IEEE Transactions on Ultrasonics, Ferroelectrics, and Frequency Control, vol. 55, No. 1, Jan. 2008. <Accessed> Dec. 1, 2010. <http://ieeexplore.ieee.org/stamp/stamp.jsp?tp=&arnumber=4454308>.*

* cited by examiner

*Primary Examiner* — Lisa M Caputo
*Assistant Examiner* — Jonathan Dunlap
(74) *Attorney, Agent, or Firm* — Oblon, Spivak, McClelland, Maier & Neustadt, L.L.P.

(57) ABSTRACT

The present application discloses a method of estimating a surface temperature of an ultrasound probe having a plurality of transducer elements and a surface, involving: a) establishing a temperature rise function of the surface of the ultrasound probe due to a single active transducer element; b) selecting one of the transducer elements; c) applying a single transmission pulse signal to the selected transducer element such that the selected transducer element operates once; d) measuring a temperature rise of the surface of the ultrasound probe at predetermined positions on the surface thereof; e) completing the temperature rise function based on the measured temperature rise; and f) estimating a temperature rise of the surface of the ultrasound probe based on the temperature rise function.

4 Claims, 12 Drawing Sheets

METHOD OF ESTIMATING SURFACE TEMPERATURE OF A DIAGNOSTIC ULTRASOUND PROBE

The present application claims priority from Korean Patent Application No. 10-2007-0001924, filed on Jan. 8, 2007, the entire subject matter of which is incorporated herein by reference.

BACKGROUND OF THE INVENTION

1. Technical Field

The present invention relates to the field of diagnostic ultrasound, and more particularly, to a method of estimating surface temperature of an ultrasound probe used in diagnostic ultrasound imaging.

2. Background Art

The ultrasound imaging diagnostic system has become an important and popular diagnostic tool due to its non-invasive and non-destructive nature. Modern high-performance ultrasound imaging diagnostic systems and techniques are commonly used to produce two- or three-dimensional images of internal features of patients.

A diagnostic ultrasound system generally uses a probe containing an array of piezoelectric elements to transmit and receive ultrasound signals. The ultrasound imaging diagnostic system forms an image of human internal tissues by electrically exciting transducer elements to generate ultrasound signals that travel into the body. Echoes reflected from tissues and organs return to the transducer element and are converted into electrical signals, which are amplified and processed to produce a diagnostic image.

FIG. 1 is a schematic diagram showing the structure of an ultrasound probe. As shown in FIG. 1, ultrasound probe 100 includes an array of transducer elements 110, matching layer 120, acoustic lens 130, and backing layer 140. Transducer elements 110 are made of a piezoelectric material, such as lead zironate titanate (PZT) and convert an electric input to an ultrasound signal and vice versa. Matching layer 120 may be formed with a plurality of layers and is used to reduce the reflection of the ultrasound signal, due to acoustic impedance mismatch between transducer elements 110 and human body. Lens 130 is to focus the ultrasound signals, while backing layer 140 is used for damping out vibration of the transducer elements to generate a short well defined ultrasound pulse.

When an electrical input is applied to transducer elements 110, some of the electrical energy is converted to heat, leading to a rise in probe surface temperature. For the purpose of patient safety and regulatory compliance, surface temperature rise due to probe self-heating must be accurately predicted and controlled in real time, because, otherwise, it may cause harm to a patient having an ultrasound exam.

Because of the complicated internal geometry of a diagnostic ultrasound probe and the lack of accurate material data, it is difficult to analyze and predict heat generation and the resulting surface temperature rise. Therefore, estimation of probe surface temperature is often based on empirical methods. Empirical methods, however, are expensive and time-consuming because they require large numbers of measurements under various possible operation conditions, e.g., imaging modes, input voltages, penetration depths, and etc. Also, empirical methods sometimes yield inaccurate predictions for operation conditions that are not covered by measurements.

Thus, the present invention overcomes the above-noted deficiencies in the art.

DETAILED DESCRIPTION OF THE INVENTION

Figure 1:
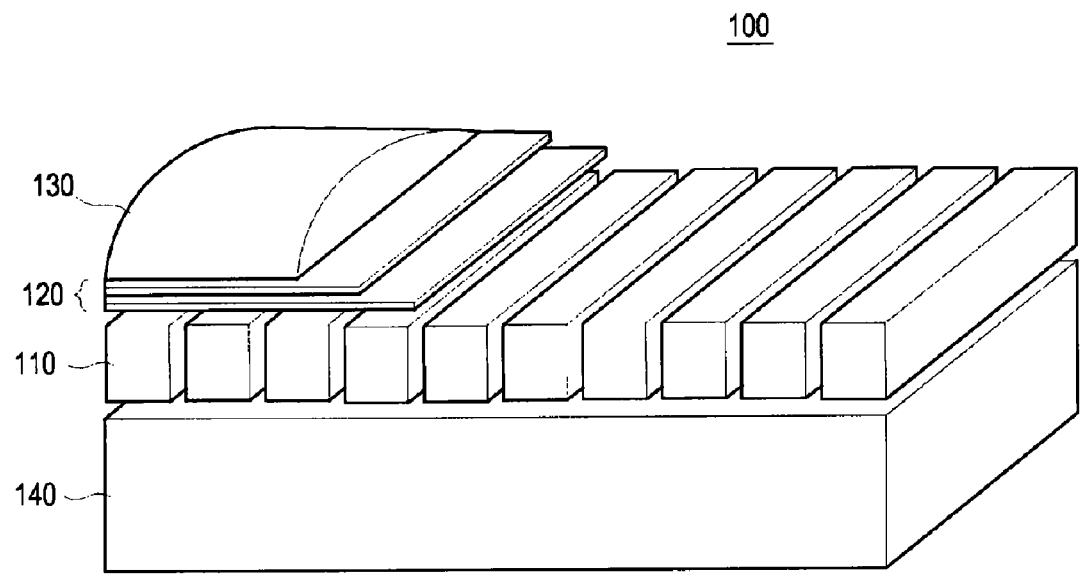
FIG. 1 is a schematic diagram showing the structure of a diagnostic ultrasound probe.
Figure 2:
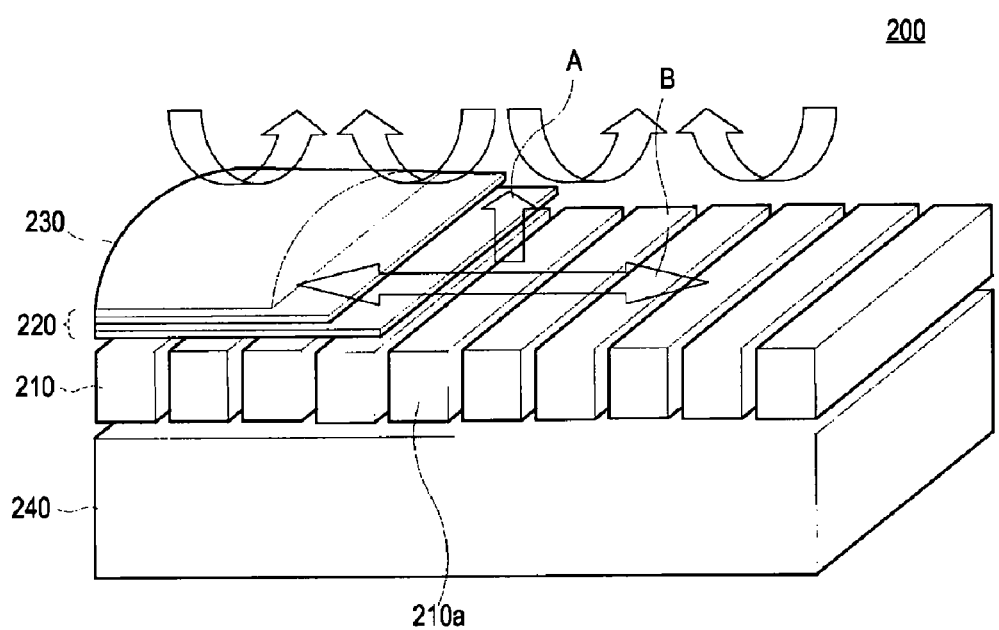
FIG. 2 is a schematic diagram showing transfer of heat generated from transducer elements of the ultrasound probe.

FIG. 2 is a schematic diagram showing the transfer of heat generated from an arbitrary transducer element in an array transducer. As shown in FIG. 2, the probe 200 includes an array of transducer elements 210, a matching layer 220, an acoustic lens 230 and a backing layer 240. In accordance with the present invention, each transducer element is considered as a heating element and the surface temperature of the probe 200 is estimated by analyzing heat transfer within and out of the probe.

Referring to FIG. 2, the heat generated from an active transducer element 210a, which is vibrated in response to a transmission pulse signal, flows in the direction A toward the probe surface and in the direction B of the array. Also, the heat may be conducted toward the backing layer 240. However, since the backing layer 240 are often made of rubber or epoxy, which has low thermal conductivity, the heat conduction toward the backing layer 240 is not considered here.

Figure 3A:
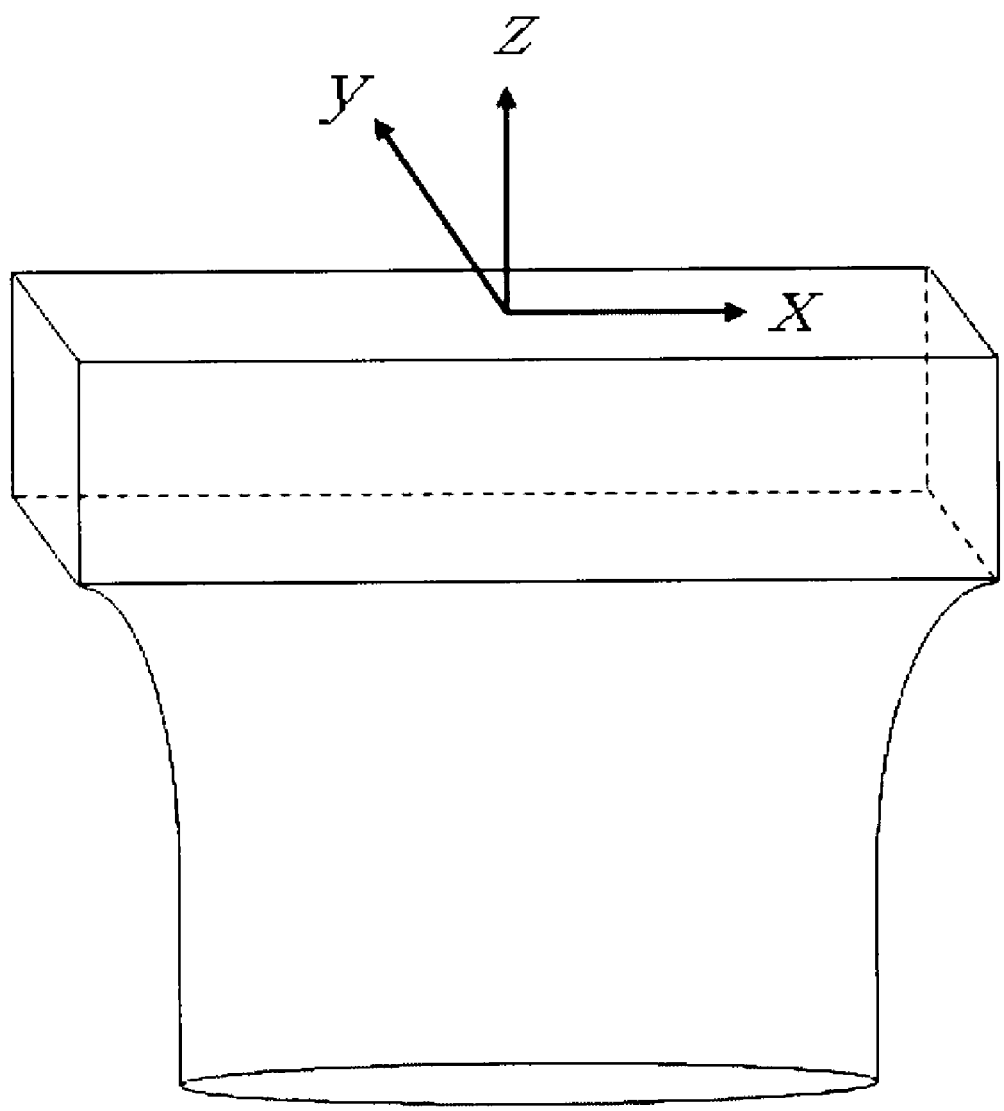
FIG. 3A is a representative diagram showing an example of X, Y, and Z axes set in the ultrasound probe.
Figure 3B:
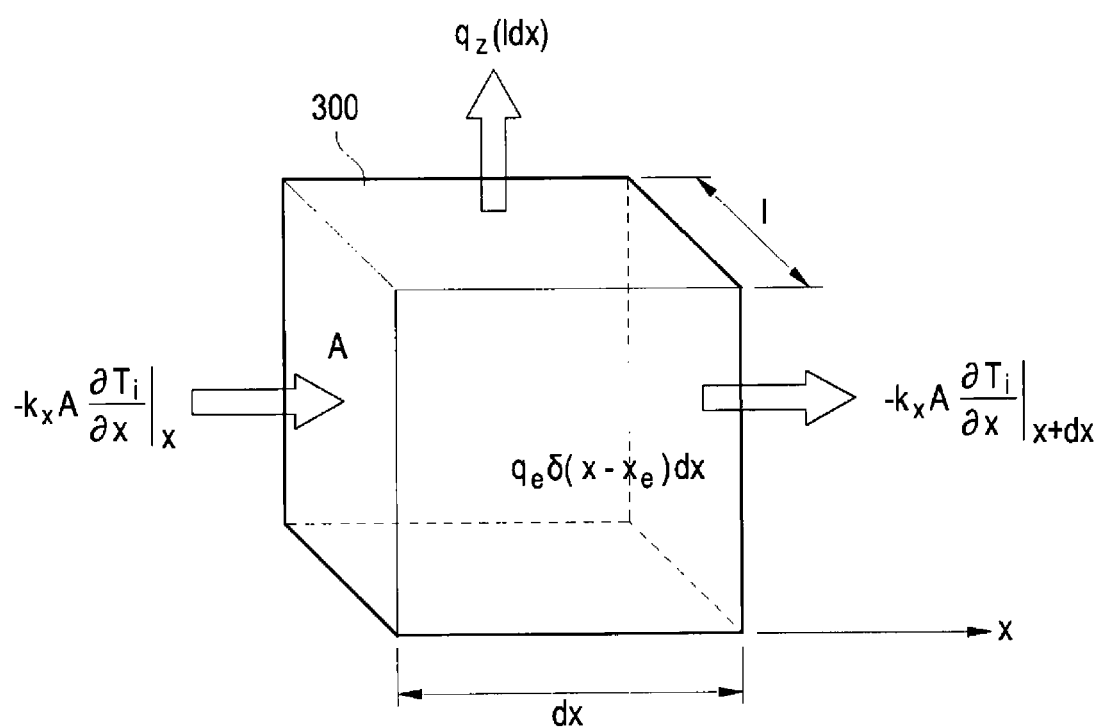
FIG. 3B is a representative diagram showing heat flow within an infinitesimal control volume containing an active transducer element.

FIG. 3A shows a coordinate system for analysis. In FIG. 3A, the X-axis represents the lateral direction of the probe 200, the Y-axis represents the elevation direction of the probe 200, and the Z-axis represents the direction of ultrasound radiation. When an input signal having a predetermined frequency is applied to an arbitrarily selected transducer element, flow of heat to and from an infinitesimal control volume 300 having a width dx can be illustrated as shown in FIG. 3B. Considering the energy balance within the infinitesimal control volume 300, the following equation (1) may be obtained.

$$0 = -k_x A \left( \frac{\partial T_i}{\partial x} \bigg|_x - \frac{\partial T_i}{\partial x} \bigg|_{x+dx} \right) dx - q_z (ldx) + q_e \delta(x - x_e) dx \quad (1)$$

Wherein $k_x$ represents the effective thermal conductivity in the X-direction, A represents an effective heat transfer area, $T_i$ represents the internal temperature of the probe 200, $q_z$ represents heat flux to the probe surface in unit time and area, l represents a length of the infinitesimal control volume 300 in the Y-axis direction, $q_e$ represents heat generated from the active transducer element, $x_e$ represents a position of the active transducer element, and $\delta(x-x_e)$ represents a Dirac delta function. Further, $$-k_x A \frac{\partial T_i}{\partial x}\bigg|_x$$

represents heat coming from the neighboring region to the infinitesimal control volume 300, $$-k_x A \frac{\partial T_i}{\partial x}\bigg|_{x+dx}$$

represents heat emitted from the infinitesimal control volume 300 to the neighboring region, $q_e \delta(x-x_e)dx$ represents heat generated from the transducer element of the width dx, and $q_z(ldx)$ represents heat emitted from the infinitesimal control volume 300 to the probe surface.

Since the heat flux $q_z$ flowing toward the probe surface have to be equal to the heat emitted into the ambient air via convection, the following equation (2) can be obtained.

$$q_z = -k_z\left(\frac{T_s - T_i}{d}\right) = h(T_s - T_\infty) \quad (2)$$

Wherein $k_z$ represents the effective thermal conductivity of the matching layer 220 and the acoustic lens 230 in the Z-axis direction, $T_s$ represents the surface temperature of the probe 200, d represents the combined thickness of the matching layer 220 and the acoustic lens 230, h represents the convection coefficient of air, and $T_\infty$ represents the ambient-air temperature.

If the equation (1) and the equation (2) are combined, heat transfer equation such as the following equation (3) can be obtained.

$$\frac{\partial^2 \Delta T_e}{\partial x^2} = \alpha^2 \Delta T_e - \beta \delta(x - x_e) \quad (3)$$

$$\alpha = \sqrt{\left(\frac{lh}{k_x A}\right) \bigg/ \left(1 + \frac{dh}{k_z}\right)}, \; \beta = \left(\frac{q_e}{k_x A}\right) \bigg/ \left(1 + \frac{dh}{k_z}\right) \quad (4)$$

Wherein $\Delta T_e = T_s - T_\infty$ represents the surface temperature rise. Parameters $\alpha$ and $\beta$ depend on the geometry and material properties of the probe, physical properties of the ambient air, and operation conditions. Especially, $\alpha$ relates to the width of surface temperature distribution in the X-direction and $\beta$ relates to the strength of each transducer element as a heat source.

Since an external housing of the probe is generally made from plastic having relatively low thermal conductivity, it is assumed that both lateral ends of the probe are adiabatic, which constitutes a boundary condition to be considered together with the heat transfer equation (3). When the total length of the probe in the lateral-direction is L, the adiabatic condition at the both ends of the probe (x=±L/2) can be expressed by the following equation (5).

$$\frac{\partial \Delta T_e}{\partial x} = 0 \quad (5)$$

A solution of the heat transfer equation (equation (3)) and the adiabatic boundary condition (equation (5)) may be obtained by means of the Fourier transform as follows.

$$\Delta T_e = \frac{\beta}{2\alpha}\left\{\left[\frac{e^{\alpha x_c} + e^{-\alpha(x_c+L)}}{e^{\alpha L} - e^{-\alpha L}}\right]e^{\alpha x} + \left[\frac{e^{-\alpha x} + e^{\alpha(x_c-L)}}{e^{\alpha L} - e^{-\alpha L}}\right]e^{-\alpha x} + e^{-\alpha|x-x_c|}\right\} \quad (6)$$

Figure 4:
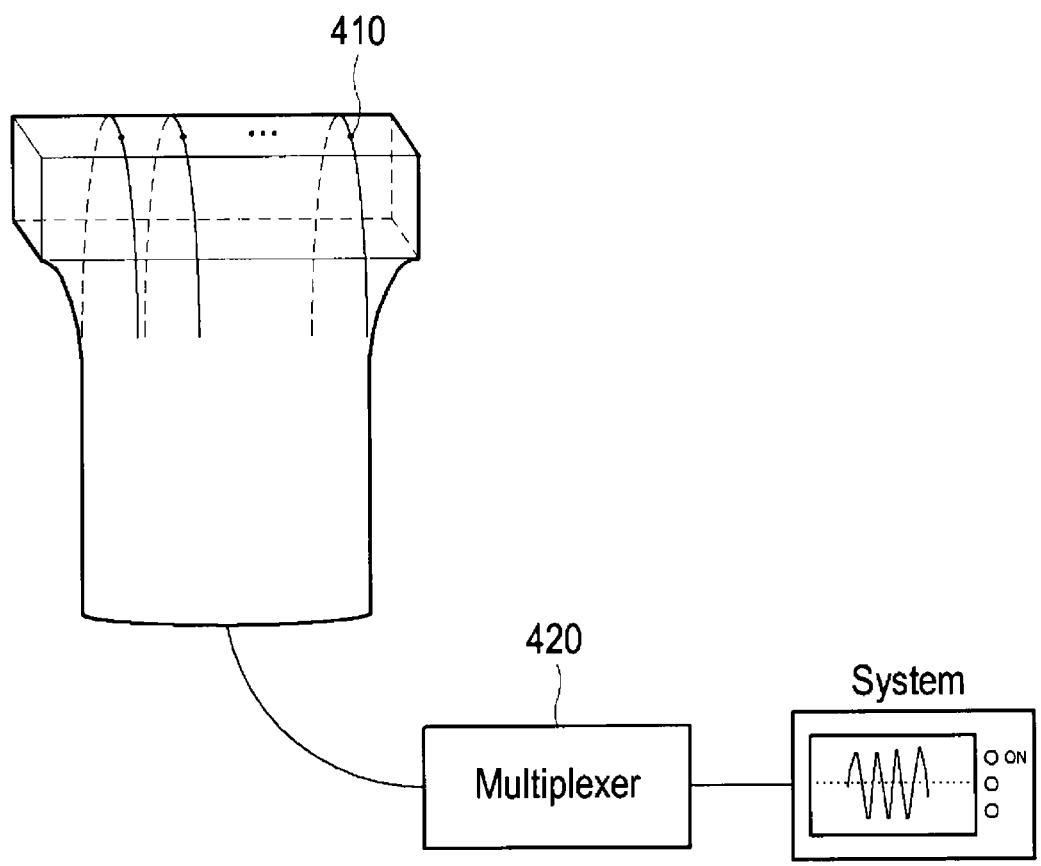
FIG. 4 is a representative diagram showing an example of measuring the surface temperature of an ultrasound probe.
Figure 5A:
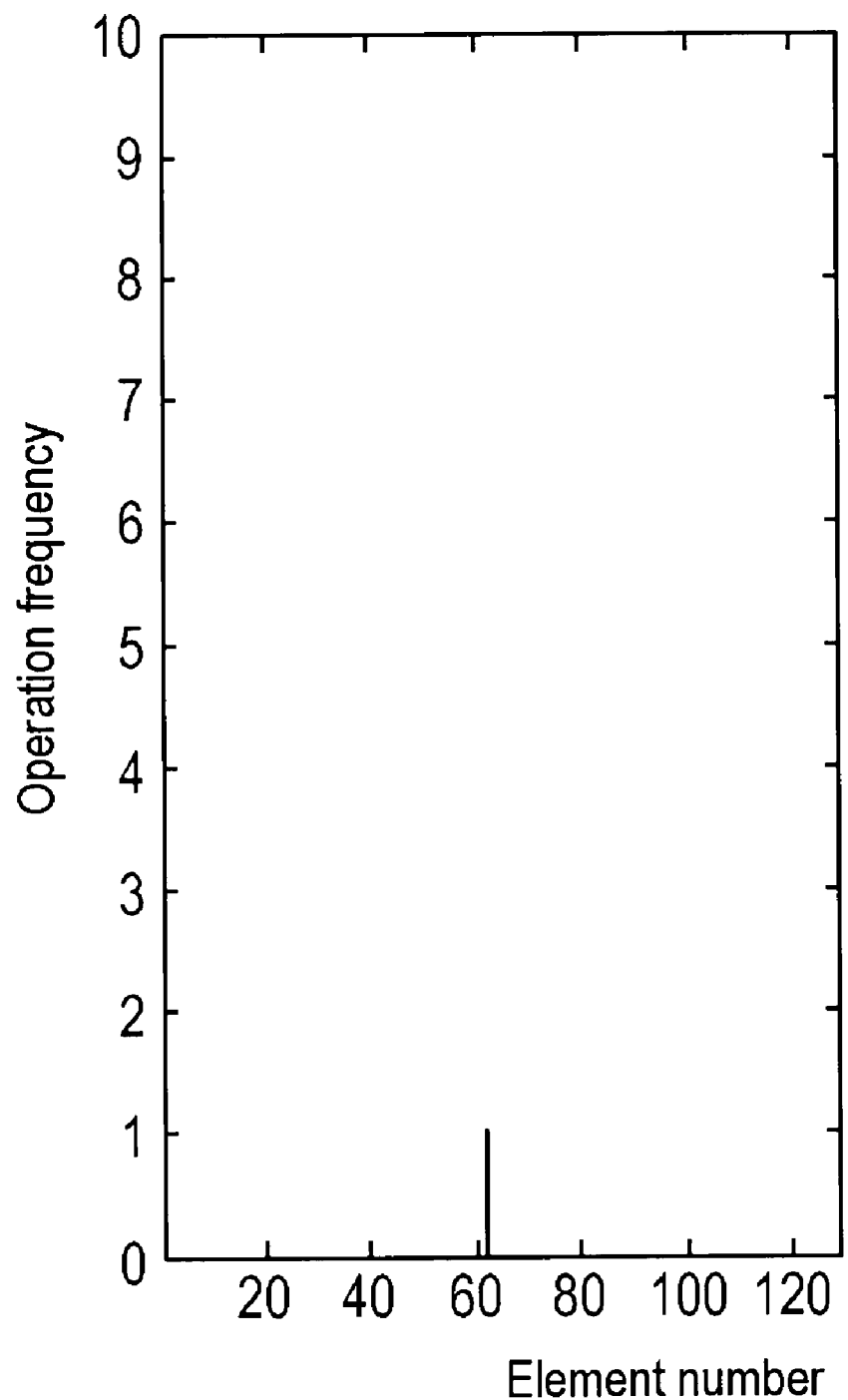
FIG. 5A is a diagram showing operation frequencies of the transducer elements.
Figure 5B:
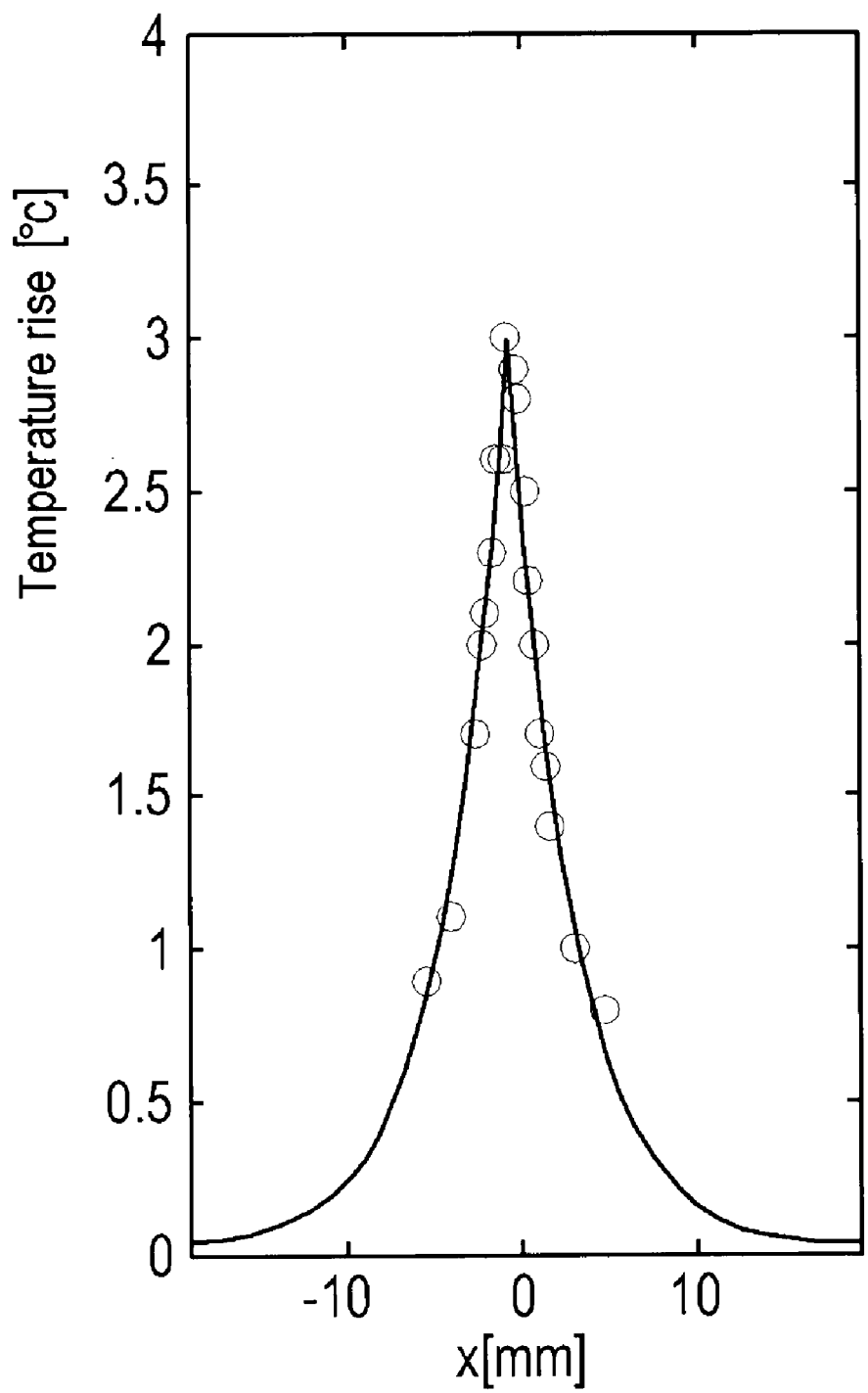
FIG. 5B shows the surface temperature rise (measure data shown with circles) in the case of a single active element.

The modeling parameters $\alpha$ and $\beta$ can be determined as follows. An array of temperature sensors 410 are placed on the probe surface as shown in FIG. 4. Thermocouples may be used as temperature sensors 410 in accordance with one embodiment of the present invention. Then, one transducer element (e.g., the center element) is selected from the plurality of transducer elements, and an input signal with predetermined frequency and amplitude is applied to the selected element. A multiplexer 420 may be used to apply the input signal exclusively to the selected element. During the excitation of the selected element, the temperature sensors 410, which are positioned at a predetermined interval on the probe surface, measure the corresponding surface temperature rise as a function of the lateral coordinate X. FIG. 5A shows the number of times the selected element fires during one transmit event, and FIG. 5B shows the resulting surface temperature rise. The modeling parameters $\alpha$ and $\beta$ are determined by least-square fitting the measurement data (shown with circles) with the analytical solution given by equation (6).

Figure 6A:
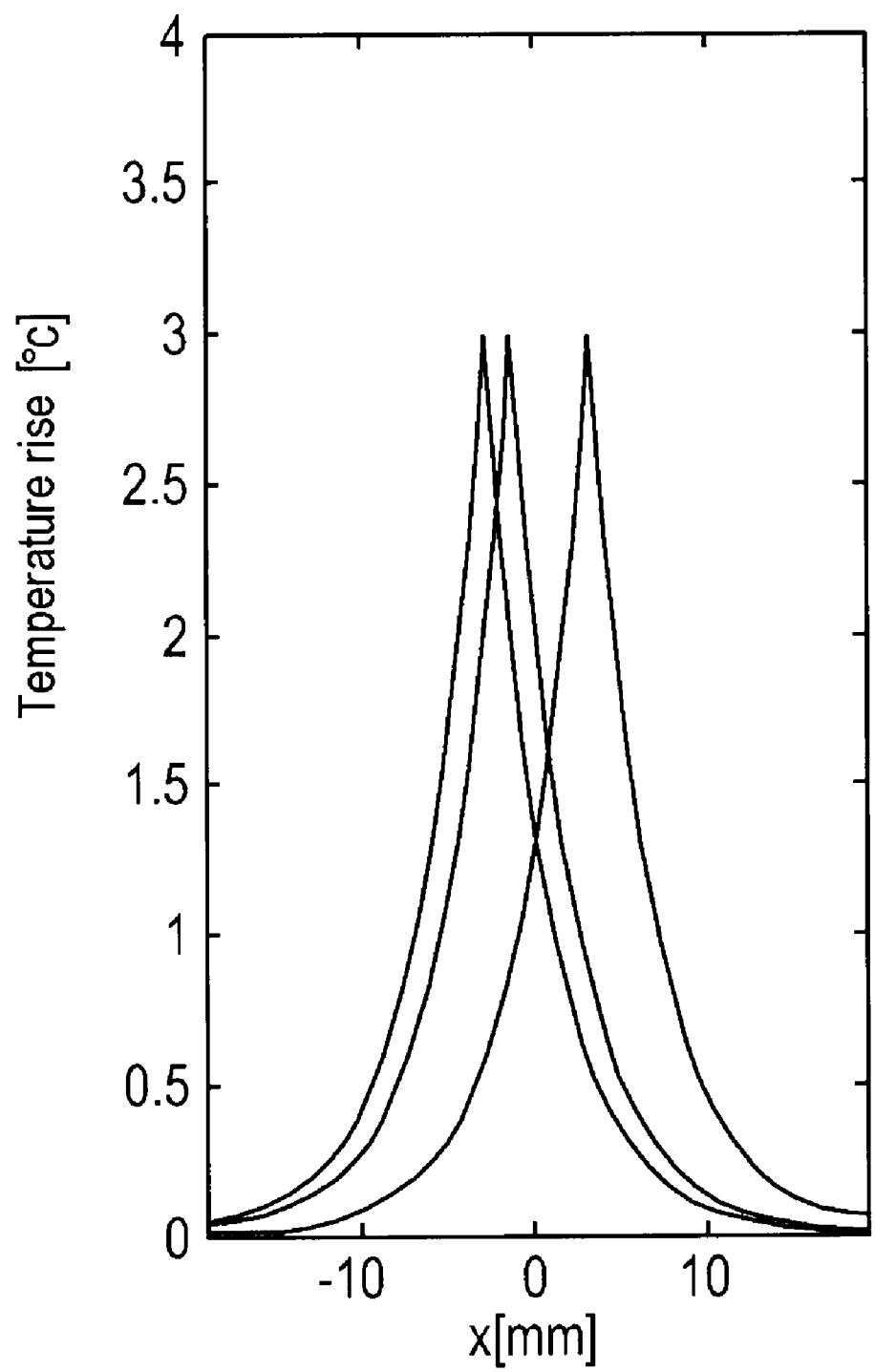
FIG. 6A shows the surface temperature rise profiles corresponding to a series of active elements.
Figure 6B:
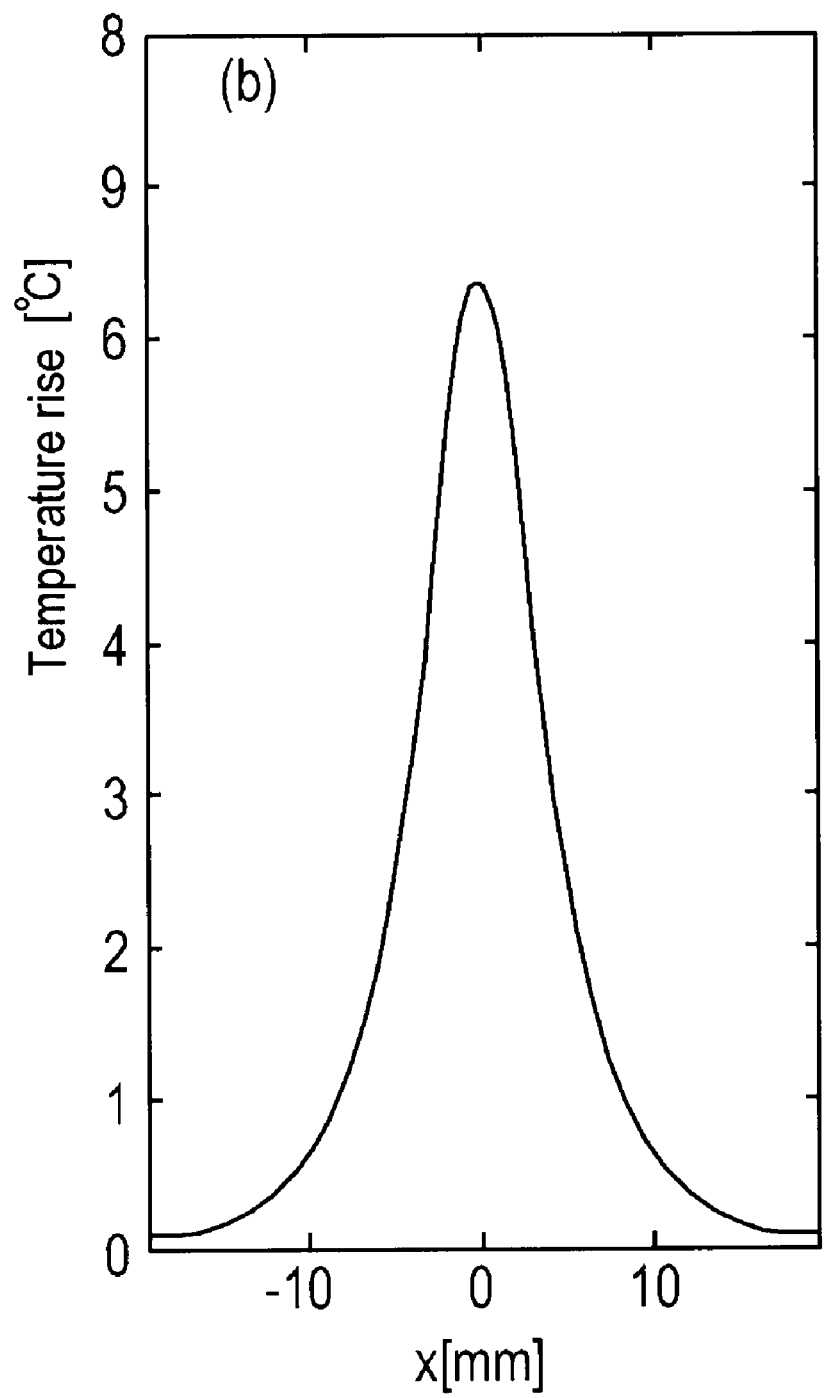
FIG. 6B shows the surface temperature rise profile estimated via the superposition principle in accordance with the present invention.

Once the surface temperature rise due to a single active element is obtained, that resulting from a multiple of active elements can be estimated by using the superposition principle with the assumption that the system is thermally linear. FIG. 6A shows surface temperature rise profiles when more than one element is firing. FIG. 6B shows an estimated surface temperature rise obtained by superposing the profiles in FIG. 6A in accordance with the present invention. This can be expressed mathematically as follows.

$$\Delta T = \sum_e W_e \times \Delta T_e \quad (7)$$

Wherein $\Delta T$ represents the overall temperature rise of the probe surface, $W_e$ represents the number of times that each transducer element fires during a transmit event. For an unscanned mode such as the Doppler mode, $W_e$ represents the number of times that each transducer element fires to transmit a single ultrasound pulse along the scan line. For a scanned mode such as B-mode, $W_e$ represents the number of times that each transducer element has to fire to complete one scan. Quantity $\Delta T_e$ represents the temperature rise due to a single active element given by equation (6).

Figure 7A:
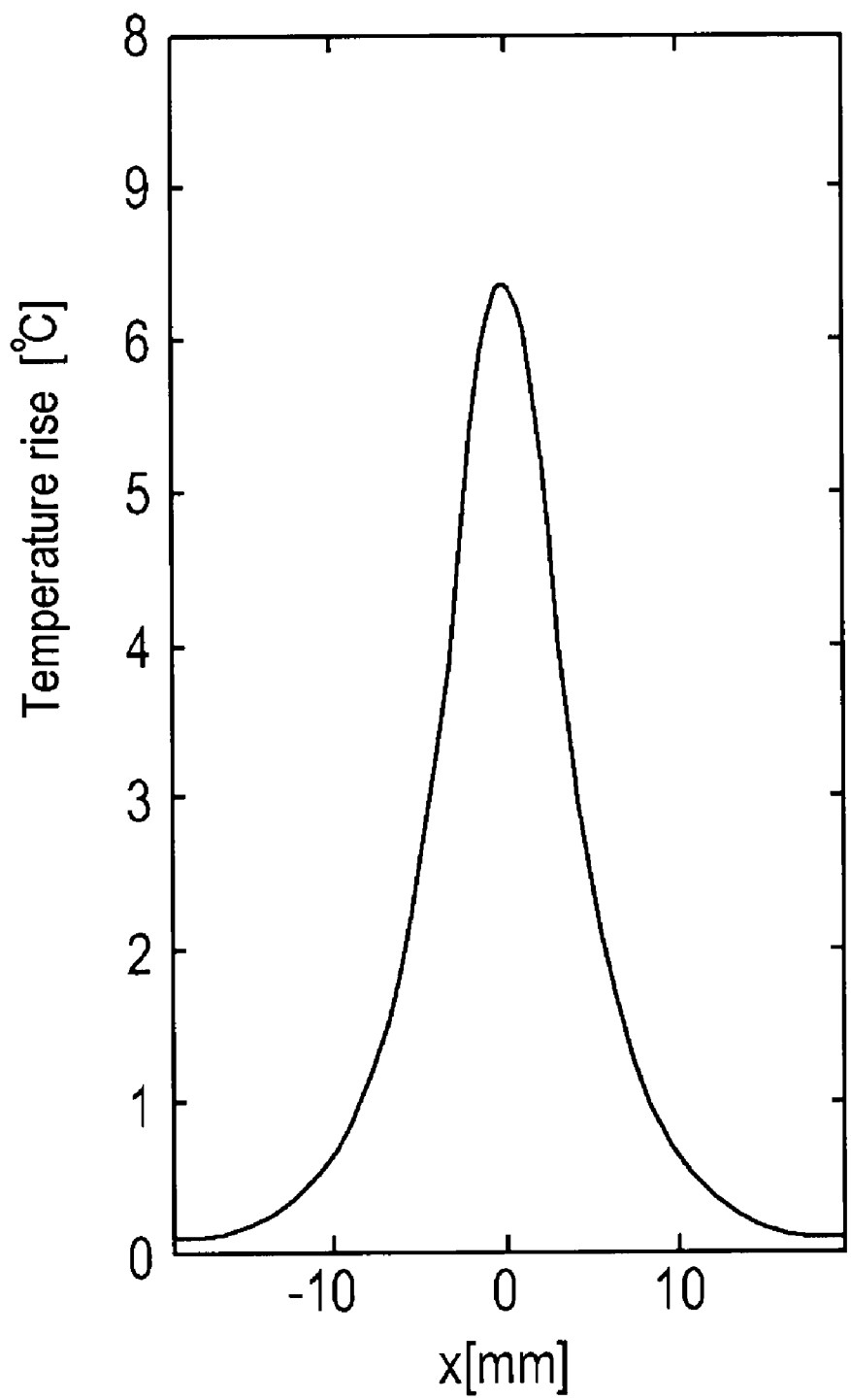
FIG. 7A is a graph showing an estimated surface temperature rise in an unscanned mode in accordance with the present invention.
Figure 7B:
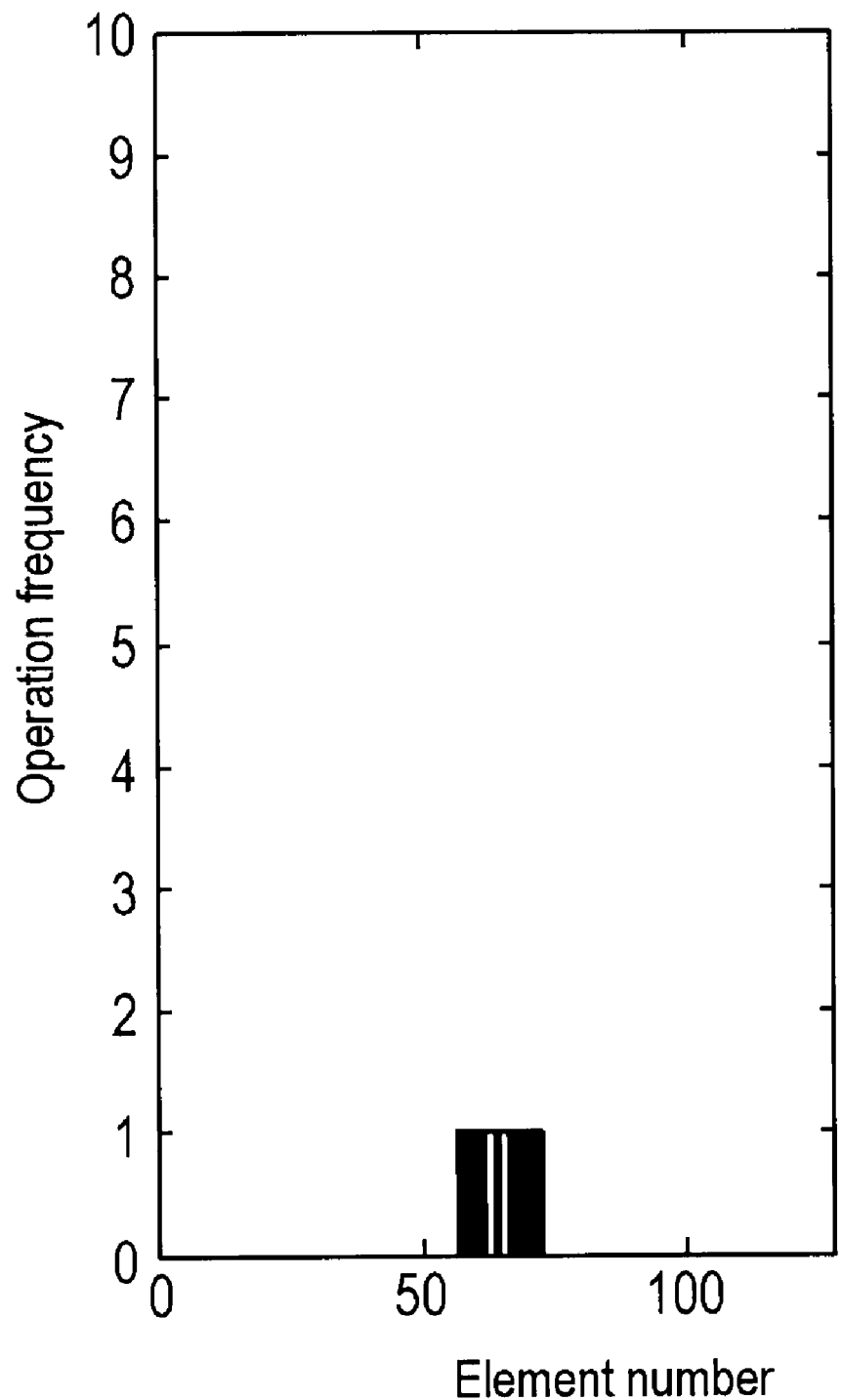
FIG. 7B is a graph showing the operation frequencies of the transducer elements in an unscanned mode.
Figure 8A:
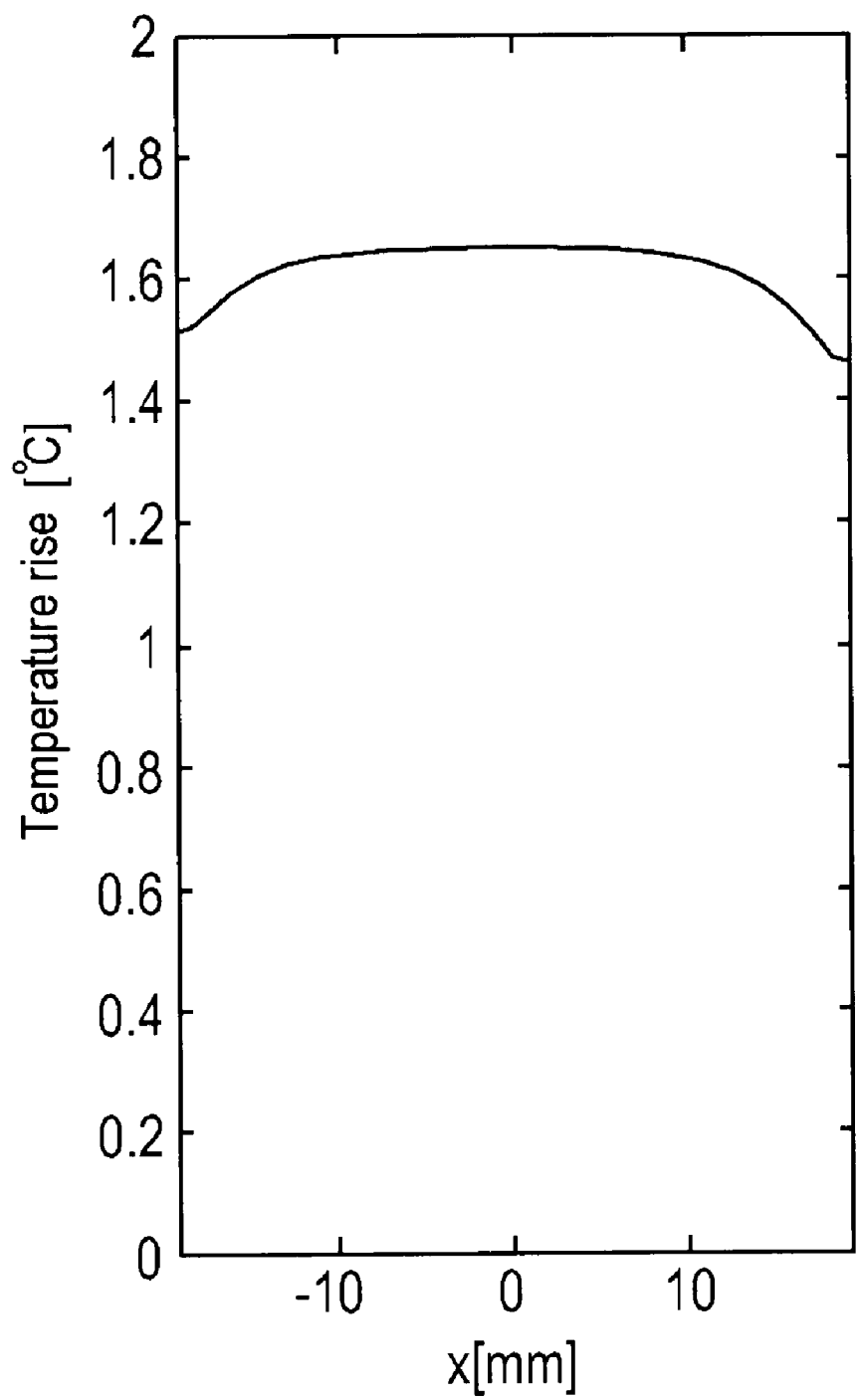
FIG. 8A is a graph showing an estimated surface temperature rise in a scanned mode in accordance with the present invention.
Figure 8B:
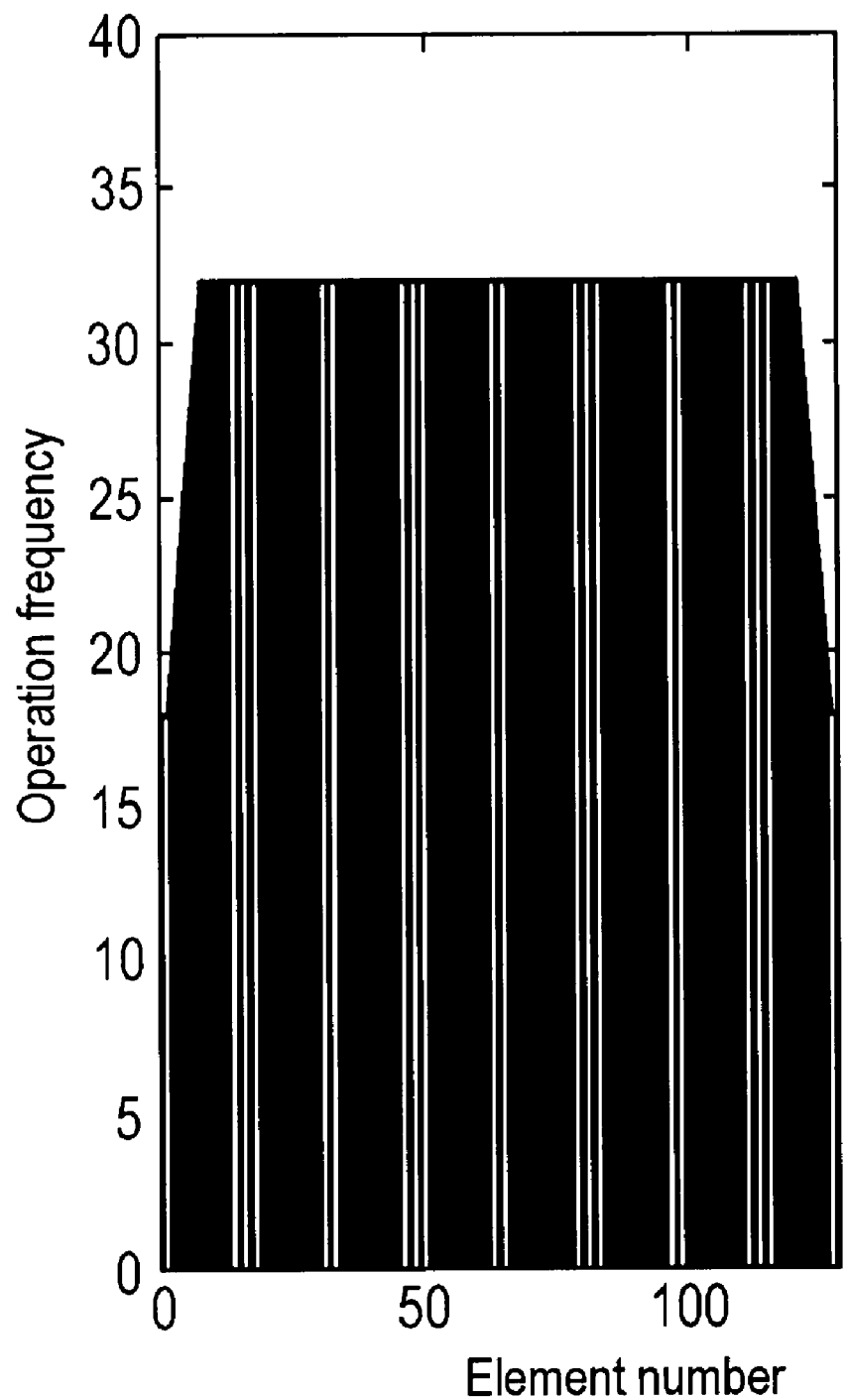
FIG. 8B is a graph showing the operation frequencies of the transducer elements in the scanned mode.

FIG. 7A is a graph showing an estimated surface temperature rise in an unscanned mode. FIG. 7B shows the operation frequency of each transducer element. FIG. 8A is a graph showing an estimated surface temperature rise in a scanned mode, and FIG. 8B shows the corresponding operation frequencies.

As mentioned above, the surface temperature rise due to an operation of an arbitrary transducer element can be semi-analytically, so that the estimation of the overall temperature rise is accurately and conveniently carried out in accordance with the present invention.

In accordance with one embodiment of the present invention, there is provided a method of estimating the surface temperature of an ultrasound probe having a plurality of transducer elements and a surface, involving: a) establishing a temperature rise function of the surface of the ultrasound probe due to a single active transducer element; b) selecting one of the transducer elements; c) applying a single transmission pulse signal to the selected transducer element such that the selected transducer element operates once; d) measuring a temperature rise of the surface of the ultrasound probe at predetermined positions on the surface thereof; e) completing the temperature rise function based on the measured temperature rise; and f) estimating a temperature rise of the surface of the ultrasound probe based on the temperature rise function.

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of estimating a surface temperature of an ultrasound probe having a plurality of transducer elements and a surface, comprising:
    a) determining heat transfer characteristics of the ultrasound probe;
    b) selecting one of the transducer elements;
    c) applying a single transmission pulse signal to the selected transducer element such that the selected transducer element operates once;
    d) measuring a temperature rise at predetermined positions on the surface of the ultrasound probe;
    e) establishing a temperature rise function based on the determined heat transfer characteristics and the measured temperature rise; and
    f) estimating a temperature rise at the surface of the ultrasound probe based on the temperature rise function.

2. The method of claim 1, wherein the heat transfer characteristics are determined based on geometry and thermal properties of the ultrasound probe and the properties of the surrounding air.

3. The method of claim 2, wherein the temperature rise is estimated by multiplying the surface temperature rise function due to each element by a number of times each transducer element fires to transmit a single ultrasound pulse.

4. The method of claim 2, wherein the temperature rise is estimated by superposing surface temperature rise functions for the respective transducer elements.

* * * * *